United States Patent

Selwan et al.

[11] Patent Number: 5,903,283
[45] Date of Patent: May 11, 1999

[54] VIDEO MEMORY CONTROLLER WITH DYNAMIC BUS ARBITRATION

[75] Inventors: Pierre M. Selwan, Fremont; Minjhing Hsieh; Mel W. Eatherington, both of San Jose, all of Calif.

[73] Assignee: Chips & Technologies, Inc., San Jose, Calif.

[21] Appl. No.: 08/921,646

[22] Filed: Aug. 27, 1997

[51] Int. Cl.⁶ .................................................. G06F 13/16
[52] U.S. Cl. ............................ 345/521; 711/151; 711/158
[58] Field of Search ..................................... 345/521, 513; 711/150, 151, 158

[56] References Cited

U.S. PATENT DOCUMENTS

| | | | |
|---|---|---|---|
| 4,011,556 | 3/1977 | Tochitani et al. | 340/324 AD |
| 4,418,344 | 11/1983 | Brown | 340/726 |
| 4,644,495 | 2/1987 | Crane | 364/900 |
| 4,760,387 | 7/1988 | Ishii et al. | 340/716 |
| 4,779,083 | 10/1988 | Ishii et al. | 340/767 |
| 4,866,742 | 9/1989 | Fujiyama et al. | 377/70 |
| 5,030,946 | 7/1991 | Yamamura | 340/750 |
| 5,122,789 | 6/1992 | Ito | 340/731 |
| 5,138,305 | 8/1992 | Tomiyasu | 340/717 |
| 5,150,456 | 9/1992 | Wu et al. | 395/114 |
| 5,345,577 | 9/1994 | Chan et al. | 711/106 |
| 5,673,416 | 9/1997 | Chee et al. | 711/151 |
| 5,767,866 | 6/1998 | Chee et al. | 345/521 |

Primary Examiner—Kee M. Tung
Assistant Examiner—Sy D. Luu
Attorney, Agent, or Firm—D'Alessandro & Ritchie

[57] ABSTRACT

In a video controller system including a video memory and first and second pluralities of functional circuits which access the video memory, requests for access to the video memory among more than one of the functional circuits are arbitrated by two levels of arbitration. In the first level of arbitration, a buffer in each of said first pluralities of functional circuits temporarily stores data read from or to be written to the video memory. A priority is assigned to requests for access from each of the functional circuits. A low limit and a high limit are assigned for each of the buffers. Requests for access to the video memory from all of the functional circuits are monitored. Each of the buffers is monitored to indicate whether the amount of data in each buffer is below the low limit or above the high limit. Access to the video memory is granted first to any requesting ones of the functional circuits whose buffers are below the low limit in order of the assigned priority. Access to the video memory is next granted to any requesting ones of the functional circuits whose buffers are not below the low limit and not above the high limit in order of the assigned priority. In the second level of arbitration, related functional circuits in the second plurality of functional circuits are grouped together under a selected functional circuit from said first plurality of functional circuits, and are provided data from the buffer in the selected functional circuit from the first plurality of functional circuits according to a priority determined by any of several methods known in the art.

7 Claims, 3 Drawing Sheets

VIDEO MEMORY CONTROLLER WITH DYNAMIC BUS ARBITRATION

BACKGROUND OF THE INVENTION

1. Field of the Invention

The present invention pertains to computer display drivers. More particularly, the present invention pertains to allocation of resources in a display driver system.

2. The Prior Art

Modem video graphics controllers for use in computers to drive display devices typically include features which permit great versatility of use. Among the features included in such video graphics controllers is the ability to manipulate pixel data from more than one source. In addition to a video memory, some of the various sources from which the pixel data may be obtained include, for example, a video capture unit, a video playback unit, a block transfer unit, and a CPU interface. Each of these sources in the video graphics controller, known as "clients", require access to the video memory to either write data to the video memory or to read data from the video memory.

A prior art scheme for arbitrating access between the various "clients" of the video memory has been employed by Chips & Technologies, Inc. In the prior art arbitration scheme, a video memory controller is equipped with a multi-channel arbitration feature. Each channel is associated with one of the clients of the video memory. Priority among the channels for access to the video memory is determined dynamically by the video memory controller according to the current needs of the requesting channel, and the assigned priorities of each of the channels.

To determine the needs of each of the channels, the video memory controller uses two pieces of information. The first piece is the amount of data that is present in each of the FIFO memory buffers of the clients. Thus information is tracked by the memory controller. The second piece of information comprises the high and low data limits for each of the FIFO memory buffers. This piece of information is stored in a set of configuration registers. For each video memory access cycle, the memory controller checks whether the FIFO buffer of each of the clients is either below the low limit or in between the low and the high limits set for each particular FIFO memory buffer.

Once the priority has been determined by the memory controller by assessing the relative data needs of each of the clients and considering the assigned priorities of each of the clients, the memory controller provides the selected client with a data transfer or memory burst from the video memory. The burst limits for data transfer in each channel are stored in burst limit registers in the memory controller. Bursts are preferably set to be long enough to fill the FIFOs past the lowlimit set point.

In this scheme, each of the memory requesters of the video memory is a client of the memory controller. Since different groups of some of the clients can be related to one another, the most efficient scheme for allocating data access to the video memory may not be to make every data requestor a client of the video controller.

It is therefore an object of the present invention to group related clients that have differing data access needs.

It is a further object of the present invention to implement a two-level arbitration scheme, wherein on the first level of arbitration the memory controller arbitrates the data access between its clients, and on the second level of arbitration, selected clients, independently of the memory controller, arbitrate between a group of similar sub-clients.

BRIEF DESCRIPTION OF THE INVENTION

According to one aspect of the present invention, a video controller system is equipped with a two-level hierarchical scheme arbitration. In the first level of arbitration, a video controller employs a multi-channel arbitration feature. Each channel is associated with a client of the memory controller, and is assigned a priority which is dynamically determined by the current need of the requesting channel. The frequency of re-arbitration and the relative weight of the priority of each channel is determined by a set of configuration registers and by tracking the fullness of the FIFO buffer of each channel. Set points for FIFO highlimit and lowlimit are stored in the configuration registers. Burst limits for data transfer in each channel are also stored in burst limit registers. Bursts are preferably set to be long enough to fill the FIFOs past the lowlimit set point.

In the second level of arbitration each of the clients of the memory controller have additional sub-clients among whom priority is determined by the client. The sub-clients of a particular client are selected because their data access patterns are interdependent. The particular arbitration feature employed by each of the clients to assess the priority of the data requesters is determined by the features of the client, but may include for example, a FIFO with a low limit level, a fixed priority or a round robin.

According to another aspect of the present invention, the video memory controller of the present invention sends an entire line of pixels to the display engine in a plurality of bursts.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
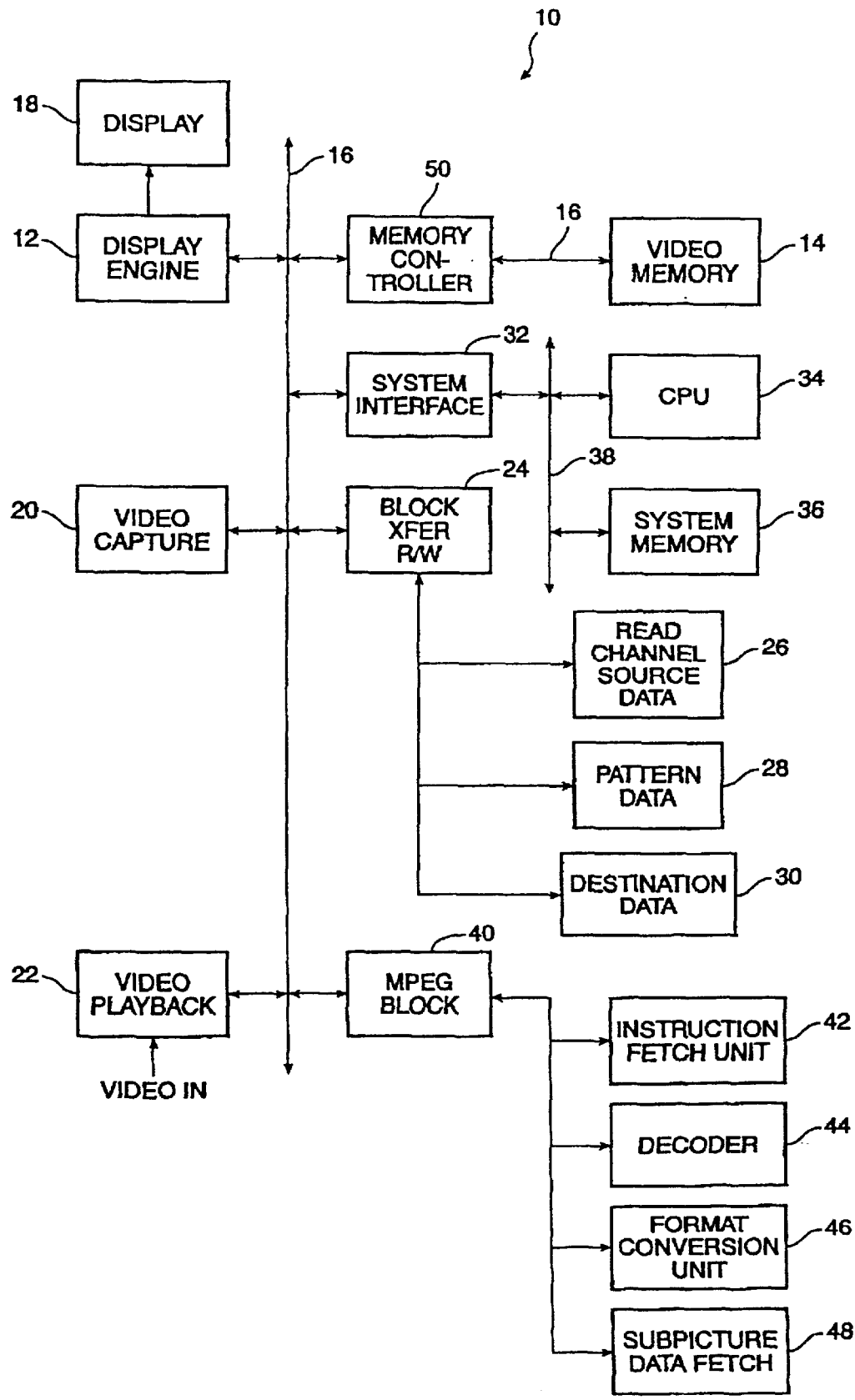
FIG. 1 is a block diagram of a video controller system including the arbitration features of the present invention.

Referring first to FIG. 1 a block diagram of a video controller system 10 including the arbitration features of the present invention is presented. Those of ordinary skill in the art will recognize that video controller system 10 is usually implemented as a single integrated circuit, although chip boundaries may vary in particular designs.

Like all video controller systems in the prior art, video controller system 10 of the present invention includes a display engine 12 and a video memory 14. Data is transferred from the video memory 14 to the display engine 12 via bus 16 as is well known in the art. Display engine 12 then drives display 18, which may comprise a CRT display system or a flat panel display as is known in the art.

Video controller system 10 may also include other functional blocks. In the illustrative embodiment depicted in FIG. 1, video controller system 10 also includes a video capture unit 20, for capturing video images for later display on display 18. A video playback unit 22 is provided to playback video images. Block transfer unit 24 is used to transfer large blocks of data to and from video memory 14 for the read channel source data 26, pattern data 28, and destination data 30 functional blocks. CPU interface 32 provides a path for reading and writing to the video memory 14 from a CPU 34 and system memory 36 via a PCI bus 38 as is known in the art. An MPEG block 40 is used to decompress data for storage in the video memory 14, and provides access to an instruction fetch unit 42 that reads instructions from the video memory 14 for the MPEG block 40, a decoder 44 that reconstructs the I-frames from the reference frames, a format conversion unit 46 that converts information regarding a block of pixels into a single pixel, and a subpicture data fetch unit 48 that reads a caption to an underlying frame. The above-recited list is not intended to be exhaustive and persons of ordinary skill in the art will understand that other non-illustrated blocks may be employed, and further, that fewer than all the blocks illustrated in FIG. 1 may be employed in any system actually fabricated according to the present invention.

As will be appreciated by persons of ordinary skill in the art, all of these functional blocks, sometimes referred to as "clients", compete with the CRT display engine 12 for the video memory 14 resource. According to the present invention, a two-level system of arbitration is implemented to provide clients data access to the video memory. In a first level of arbitration, a video memory controller 50 controls the flow of data on bus 16 by arbitrating between competing client requests for data access to the video memory 14.

In a second level of arbitration, various clients that might ordinarily be under the direction of the memory controller 50 are grouped as "sub-clients" under the control of a larger client. For example, the instruction fetch unit 42, decoder 44, format conversion unit 46, and subpicture data fetch unit 48 are sub-clients of the MPEG block 40, and the read channel source data 26, pattern data 28, and destination data 30 are all sub-clients of the block transfer unit 24. The sub-clients are grouped together because their data access patterns are interdependent.

As is apparent, CRT display engine 12 has a critical need for data from the video memory 14. Any inability of the video memory 14 to supply pixels sufficient for a display frame will cause noticeable glitches in the video display 18, which will be an intolerable condition under normal circumstances. Those of ordinary skill in the art will also understand that the needs of the other clients for access to the video memory resource is variable, depending on the combination of factors which exit at any particular point in time.

The various clients served by the video memory 14 each include a first-in-first-out (FIFO) buffer which is used to buffer data transfers between the client and the video memory. The apparatus of the present invention takes advantage of the presence of the FIFO buffer in each client of the video memory to implement the first level of the arbitration scheme according to the present invention. A portion of a representative one of the client blocks 56 of video controller 10 is shown in expanded block form in FIG. 2. Client block 56 includes functional circuitry 58, the configuration of which depends on the function performed by client block 56. Such circuitry is known to persons of ordinary skill in the art, disclosure of which herein is not necessary for an understanding of the operation of the present invention.

Figure 2:
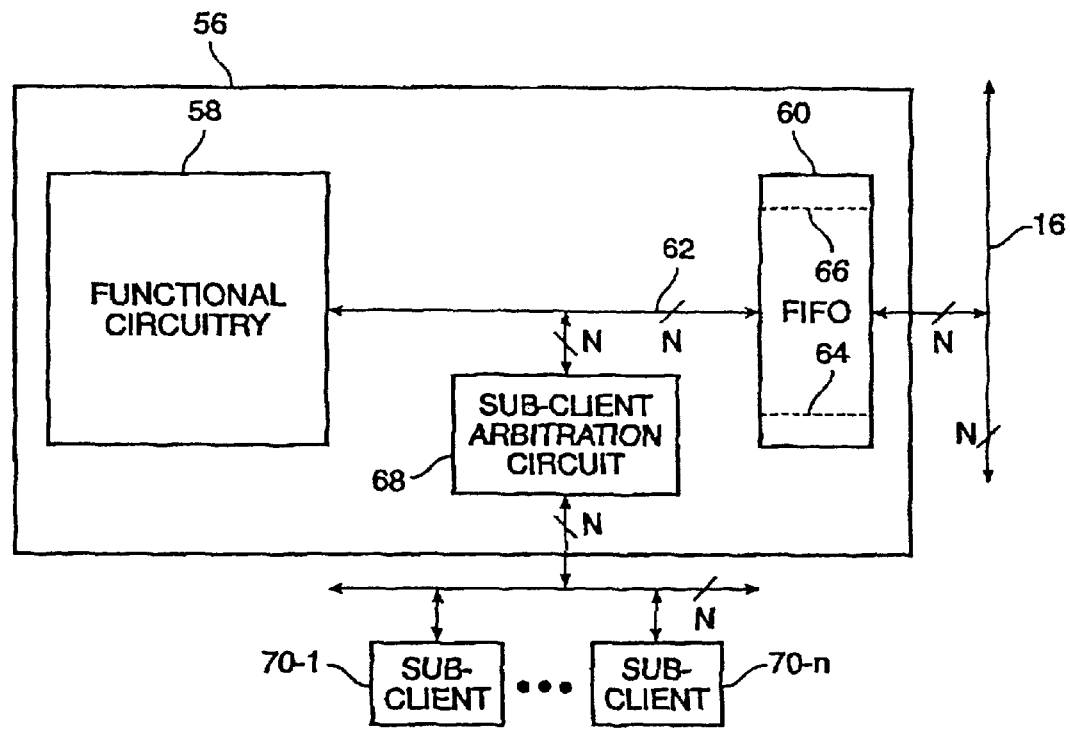
FIG. 2 is a more detailed block diagram of a portion of a typical one of the client blocks of the video controller system of FIG. 1.

Functional circuitry 58 communicates with bus 16 via FIFO buffer 60. As shown in FIG. 2, N-bit bus 16 communicates with FIFO buffer 60 and FIFO buffer 60 communicates with functional circuitry 58 via an N-bit internal bus 62. Both N-bit internal bus 62 and the connection between FIFO 60 and N-bit bus 16 are shown having double-headed arrows in order to portray client block 56 generically. Depending on the nature of client block 56, it may write to N-bit bus 16, read from N-bit bus 16, or both read from and write to N-bit bus 16 as will be readily understood by those of ordinary skill in the art.

According to the present invention, the FIFO 60 in each client block 56 has associated with it two critical levels, a lowlimit level and a highlimit level. The lowlimit level is represented as dashed line 64 and the highlimit level is represented as dashed line 66 in FIG. 2. The lowlimit level 64 will be higher than zero and the highlimit level 66 will be lower than the full capacity of the FIFO buffer 60. These levels will depend on features of the particular architecture of any given video graphics controller, such as number and nature of client blocks, FIFO sizes, etc., and may be determined by the designer on a case-by-case basis.

According to the present invention, the lowlimit level 64 and the highlimit level 66 for the FIFO 60 in each individual client block 56 may be set and altered using configuration registers to be disclosed herein. The lowlimit level 64 and the highlimit level 66 for each FIFO 60 are used according to the present invention by the memory controller 50 to dynamically adjust the first level of arbitration between competing clients for the video memory 14 resource.

In the representative client block 56, sub-client arbitration circuit 68 implements the second level of arbitration according to the present invention. It should be appreciated that for those clients that do not have further sub-clients, the sub-client arbitration circuit 68 will not be present in the client block 56. The sub-client arbitration circuit 68 for the second level of arbitration is shown generically, because the particular function of the client block 56 will affect the selection of the arbitration scheme implemented by the sub-client arbitration circuit 68. Any well known arbitration methods, including high and low watermark FIFO's, round robin, and fixed priority, as well as other priority schemes known to those of ordinary skill in the art may be implemented by the sub-client arbitration circuit 68 in the second level of arbitration. In each of these methods, an order of priority among the sub-clients 70-1 through 70-n of a particular client block 56 is determined according to the selected priority scheme, and access by the sub-clients 70-1 through 70-n to the FIFO buffer 56 of the client block 56 is permitted according to this priority.

Figure 3:
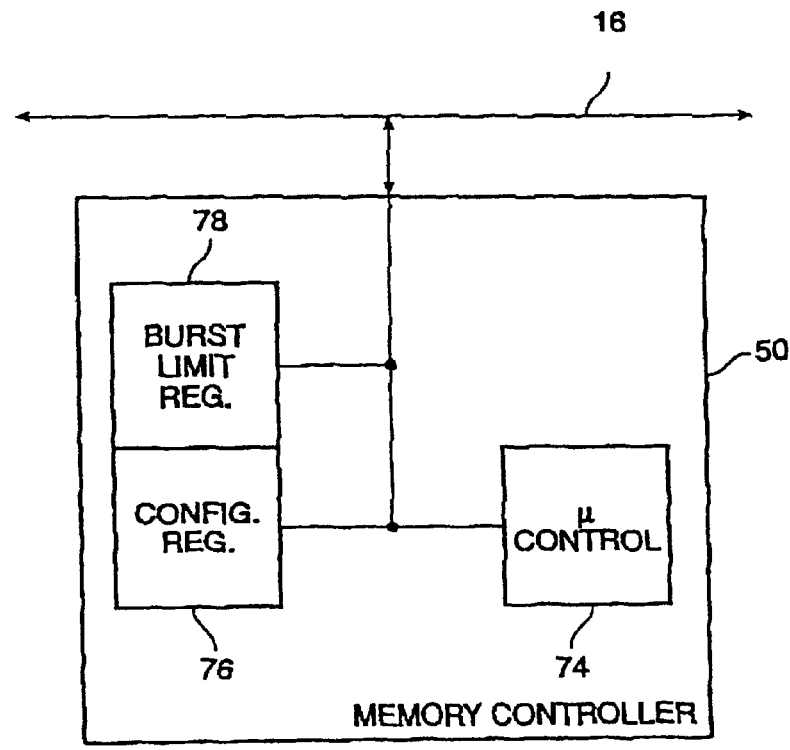
FIG. 3 is a more detailed block diagram of the arbiter block of the video controller system of FIG. 1.

Referring now to FIG. 3, a block diagram of a portion of the memory controller 50 of the present invention is shown. Memory controller 50 is run by a microcontroller 74 which controls the flow of data on N-bit bus 16. The general operation of a video memory controller to control a video memory bus is known in the art. Microcontroller 74 arbitrates between competing requests for use of the N-bit bus 16 for data transfers between video memory 14 of FIG. 1 and the client blocks of FIG. 1 which use it as a resource.

Configuration register 76 holds lowlimit level 64 and highlimit level 66 set points for the FIFO buffers of each of the client blocks in FIG. 1. These set points are used in the implementation of the first-level of arbitration aspect of the present invention. According to this aspect of the present invention, the microcontroller 74 keeps track of the status of the FIFO buffers in each of the client blocks of the system of FIG. 1. Burst limit register 78 contains the value of the longest burst to be used to service the FIFO in that client block.

When the amount of data in a FIFO buffer 60 is less than the lowlimit set point stored in the configuration register 76 for the FIFO buffer 60, the microcontroller 74 considers the client block 56 containing that FIFO buffer 60 to be critically in need of more data. Client blocks 56 having FIFO buffers 60 containing fewer data than the lowlimit set point 64 will be serviced according to a predetermined hierarchical order. It should be appreciated that the microcontroller 74 only considers the needs of client blocks 56 in the first-level of arbitration.

The second level of arbitration is controlled by the sub-client arbitration circuit 68. Accordingly, as the sub-client arbitration circuit 68 provides the sub-clients of a client 56 access to the FIFO buffer 60 of the client, the microcontroller 74 only indirectly keeps track of the data needs of the sub-clients 70-1 through 70-n by being aware of the status of the FIFO buffer 60 of the client 56. By properly grouping the sub-clients 70-1 through 70-n under a single client 56, the arbitration of the N-bit bus 16 can be made more efficient because the microcontroller 74 can more readily respond to the clients 56 requiring access to the video memory 14.

Those of ordinary skill in the art will recognize that some client blocks 56, such as those used for cursor generation, do not require FIFO buffers 60 for their operation. For the purposes of the present invention, such client blocks 56, when requesting service, are considered equivalent to, and are thus treated as, client blocks with FIFO levels below their lowlimit set point.

When the amount of data in a FIFO buffer 60 is between the lowlimit set point and the highlimit set point stored in the configuration register 76 for the FIFO buffer 60, the microcontroller 74 will service the client block 56 containing that FIFO buffer 60 in a predetermined hierarchical order if no client block 56 FIFO buffer 60 is below its lowlimit set point 64. When the amount of data in a FIFO buffer 60 is greater than the highlimit set point 66 stored in the configuration register 76 for the FIFO buffer 60, the microcontroller 74 considers that the client block 56 containing that FIFO buffer 60 is presently not in need of more data.

As previously noted, there is a hierarchy of importance of client blocks 56. This hierarchy is determined largely by the bandwidth of the particular block and other system considerations and is used to set the relative priorities of the blocks requesting access to the video memory 14. As would be expected, read requests by the CRT display engine 12 has the highest priority for service by the video memory 14, since seamless video display is of great importance in computing systems which employ video controllers.

The lowlimit set point 64 of each client block 56 is best set by relying on the latency of that client block 56 with respect to all of the other client blocks 56. For any client block 56, its latency is set to be equal to the maximum burst duration of any client block 56 below it in the hierarchy plus the total burst duration of all of the client blocks 56 above it in the hierarchy. In an actual implementation of the present invention, where the FIFO buffer 60 depth is 32 bytes, the lowlimit 64 of the display engine 12 is 8 bytes, the highlimit 66 is set to be 16 bytes, and the burst limit is set to be 24 bytes.

In an actual integrated circuit fabricated according to the teachings of the present invention, the order of priority of the various client blocks 56 included thereon is as follows: CRT display engine read request with lowlimit true; flat panel display buffer read request with lowlimit true; flat panel display buffer write request with lowlimit true; video capture write request with lowlimit true; cursor read request (no FIFO but treated as if with lowlimit true); video playback read request with lowlimit true; CPU write request with highlimit false; CPU read request with highlimit false; bit block transfer write request with highlimit false; bit block transfer write request with highlimit false;CRT display engine read request with highlimit false; flat panel display buffer read request with highlimit false; flat panel display buffer write request with highlimit false;video capture write request with highlimit false; and video playback read request with highlimit false.

Once the arbitration decision has been made to service a video memory access request from a chosen one of the client blocks of FIG. 1, the memory controller 50 enables and controls the data transfer to or from video memory 14. The data transfer may be accomplished in a conventional manner.

According to a presently preferred embodiment of the invention, microcontroller 74 interrogates burst limit register 78 to obtain information defining the maximum number of data words to transfer to or from video memory 14 in a single service routine. A default value for this maximum burst limit for each client block of FIG. 1 may be stored in firmware and transferred to the burst limit register 78 on system startup, but, as will be appreciated by those of ordinary skill in the art, provision may be made to write directly to individual locations of burst limit register 78 to override the default value for more control over this parameter.

According to the present invention, it is desirable to avoid short bursts for several reasons. First, it takes a certain fixed number of clock cycles to obtain the first data byte from memory, representing a fixed overhead for memory operations. The longer the bursts used in each memory cycle, the smaller this fixed overhead is as a percentage of the memory burst cycle. As presently preferred, bursts of less than two DRAM page mode cycles (16 bytes) should be avoided. In addition, use of the present invention in lap-top computers and other battery-operated devices conserves power for longer battery life.

On the other hand, the burst limit register 78 for each client block 56 should be set to a value for each FIFO buffer 60 high enough to take it over the lowlimit set point 64. If a smaller burst limit is used, the possibility exists for the client block 56 to require two consecutive service routines to bring its FIFO buffer 60 over the lowlimit set point 64.

According to an alternate embodiment of the present invention, configuration register 76 and burst limit register 78 could be located in each individual client block 56, rather than in memory controller 50. In such an embodiment, each individual client block 56 will determine for itself whether it needs service and two lines from each client block 56 will communicate with memory controller 50, one for a lowlimit flag for indicating to the memory controller 50 that its FIFO buffer 60 is below the lowlimit set point 64 contained in its configuration register, and one for a highlimit flag for indicating to the memory controller 50 that its FIFO buffer 60 is above the highlimit set point 66 contained in its configuration register.

Figure 4:
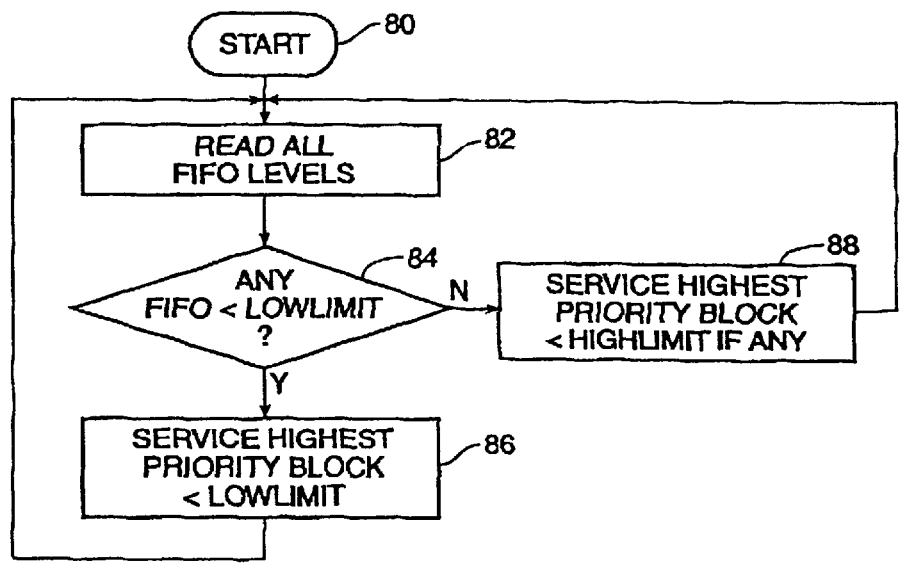
FIG. 4 is a flow diagram illustrating the operation of the memory controller of the present invention.

FIG. 4 is a flow diagram which depicts an illustrative process flow for the overall memory access service request process just described. The process starts at step 80. First, at step 82, the microcontroller 74 polls the FIFO buffers 60 in all of the client blocks 56 to determine how much data is contained in each FIFO buffer 60. Then, at step 84, the microcontroller 74 compares the polled FIFO use data with the lowlimit set points contained in configuration register 76 for each FIFO buffer 60 to determine if any client block 56 is in critical need of access to the video memory 14. If one or more FIFO buffers 60 contains fewer data words than the lowlimit set point 64, the microcontroller 74 services the memory access request of the one of the client blocks 56 having the highest priority at step 86. The process then returns to step 82, where the levels of all FIFO buffers 60 are again checked. Steps 84 and 86 are then repeated until no FIFO buffer 60 contains fewer data words than its lowlimit set point 64.

When the decision at step 84 is that no FIFO buffer 60 contains fewer data words than its lowlimit set point 64, the process proceeds to step 88. If one or more FIFO buffers 60 contains fewer data words than the highlimit set point 66, the microcontroller 74 services the memory access request of the one of the client blocks 56 having the highest priority. Those of ordinary skill in the art will recognize that, while it is likely that the priority of the client blocks 56 will be the same for both the lowlimit and highlimit service operation sequences, this is not required according to the present invention.

After the microcontroller 74 has serviced any pending memory access request from a client block 56 with a below-highlimit FIFO, the process then returns to step 82, where the levels of all FIFO buffers 60 are again checked. Steps 84 and 86 are then repeated until no FIFO buffer 60 contains fewer data words than its lowlimit set point 64, and the process again returns to step 88 and attempts to service the highest priority from among any pending memory access requests from client blocks 56 with below-highlimit FIFO contents, after which it returns to step 82.

On occasion, the FIFO buffer 60 of the requesting client block 56 to be serviced will not need the number of data words specified in the burst limit register 78. For example, if the amount of data in a FIFO buffer 60 in a client block 56 is just under the highlimit level 66, the burst limit value for that FIFO buffer 60 stored in burst limit register 78 may be too large and would overflow the FIFO buffer 60. In order to prevent this condition from occurring, the microcontroller 74 subtracts the actual FIFO level in the selected client block 56 (which it already uses to make the lowlimit/highlimit decision) from the capacity of the FIFO buffer 60 (a fixed parameter which it knows), and compares the result with the burst limit value for that FIFO buffer 60 in the burst limit register 78. If the subtraction result is less than the burst limit value, the microcontroller 74 limits the data transfer to the number of data words needed to completely fill FIFO buffer 60. This avoids FIFO overflow, which would result in lost data.

Figure 5:
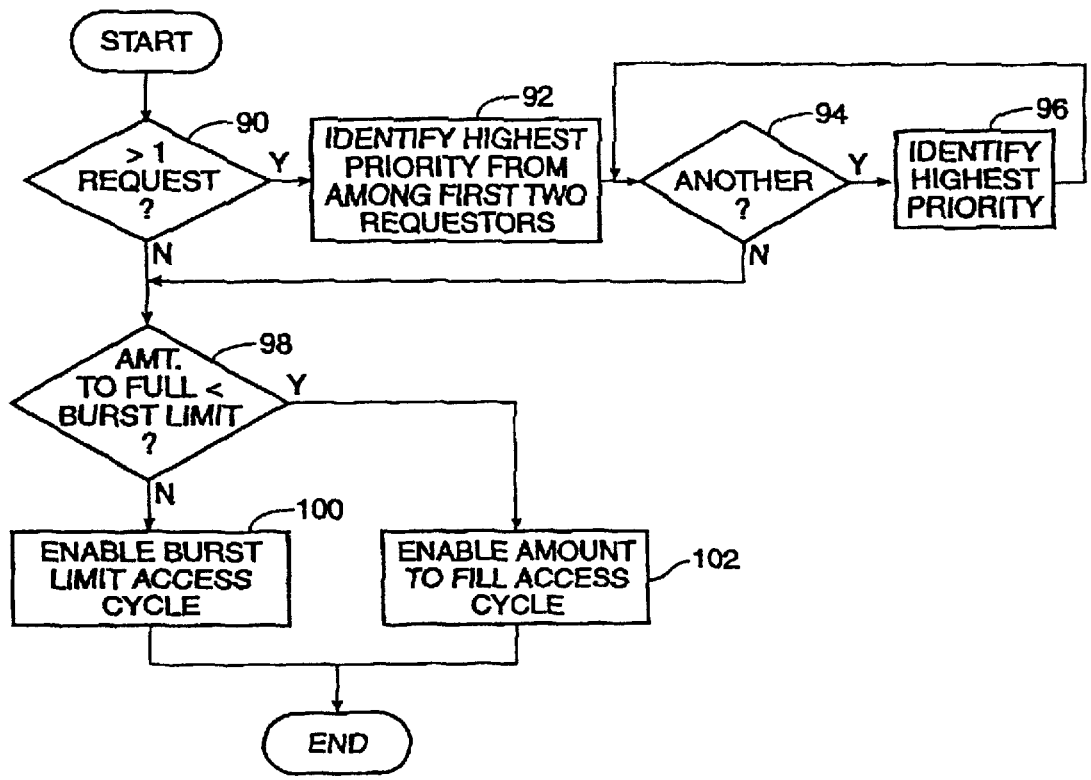
FIG. 5 is an expansion of the client block service routine of the flow diagram of FIG. 4.

This aspect of the operation of the present invention, as well as a manner of priority determination suitable for use in the present invention, is illustrated in the flow diagram of FIG. 5, which is an illustrative process flow of an expansion of the process step 88 of the flow diagram of FIG. 4. First, at step 90, it is determined whether more than one client block 56 qualifies for memory access request servicing. If so, priority is determined between the first two candidates at step 92. This may be done, for example, by assigning ascending or descending numbers to the client blocks 56 in order of priority and comparing the numbers of competing requesters.

Next, at step 94, it is determined whether there are additional candidates. If so, priority is determined between the previous winner and the next candidate at step 96. Steps 94 and 96 are repeated until there are no more candidates to compare with the latest winner.

After the requestor having the highest priority has been determined, or if there was only a single qualifying requester, the process proceeds to step 98, where it is determined whether the number of data words needed to fill the FIFO buffer 60 of the chosen requestor is less than the burst limit number of data words. If not, the process proceeds to step 100, where the microcontroller 74 executes a burst limit memory access cycle. If the number of data words needed to fill the FIFO buffer 60 of the chosen requestor is less than the burst limit number of data words, the process proceeds to step 102, where the microcontroller 74 executes enough memory read or write cycles to fill the FIFO buffer 60.

According to another aspect of the present invention, when the chosen requestor is the CRT display engine 12, it is contemplated to transfer an entire line of pixels at a time.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a video controller system including a video memory and first and second pluralities of functional circuits, the first plurality of functional circuits accessing the video memory to read therefrom or to write thereto, and each of the first plurality of functional circuits having a buffer, a method for arbitrating between requests for access to the video memory among more than one of the functional circuits, including the steps of:

storing temporarily data read from or to be written to the video memory in the buffer in each of the first plurality of functional circuits;

assigning a first level priority to requests for access to said video memory from each of said first plurality of functional circuits;

assigning a low limit and a high limit for each of said buffers;

monitoring requests for access to the video memory from all of said first plurality of functional circuits;

monitoring each of said buffers and indicating whether the amount of data in each of said buffers is below said low limit or above said high limit;

granting access to said video memory first to any requesting ones of said first plurality of functional circuits whose buffers are below said low limit in order of said first level priority;

granting access to said video memory next to any requesting ones of said first plurality of function circuits whose buffers are not below said low limit and not above said high limit in order of said first level priority;

assigning a second level priority to requests for access to said buffer of a selected one of said first plurality of functional circuits from selected ones of the second plurality of functional circuits; and granting access to said buffer of said selected one of said first plurality of functional circuits to any requesting ones of said selected ones of said second plurality of functional circuits in order of said second level priority.

2. The method of claim 1 wherein said low limit and said high limit are alterable.

3. The method of claim 1 further including the steps of:

providing at least one additional functional circuit having no FIFO buffer associated therewith;

assigning a priority to requests for access from each of said at least one additional functional circuit;

monitoring requests for access to the video memory from said at least one additional functional circuit having no FIFO buffer associated therewith; and wherein said step of granting access to said video memory first to any requesting ones of said functional circuits whose buffers are below said low limit in order of said first level priority includes granting access to said video memory to any requesting ones of said at least one additional functional circuits in order of their priority.

4. The method of claim 1 wherein said steps of granting access to said video memory first and granting access to said video memory next include performing an individually predetermined number of read or write operations for each different functional circuit of the first plurality of functional circuits if said predetermined number is less than the number of read or write operations necessary to fill is FIFO buffer and performing the number of read or write operations necessary to fill its FIFO buffer if said predetermined number is greater than the number of read or write operations necessary to fill that FIFO buffer.

5. The method of claim 1 wherein said step of granting access to the video memory next to any requesting ones of the first plurality of functional circuits whose buffers are not below said low limit and not above said high limit in order of said first level priority includes transferring data between the memory and any requesting ones of said first plurality of functional circuits in a data burst having a fixed size.

6. The method of claim 5 wherein said fixed size of said data burst for each requesting one of said first plurality of functional circuits is large enough to fill the buffer past said low limit.

7. The method of claim 6 further including the step of halting said data burst if said buffer becomes full prior to the end of said data burst.

* * * * *

UNITED STATES PATENT AND TRADEMARK OFFICE
CERTIFICATE OF CORRECTION

PATENT NO. : 5,903,283

DATED : May 11, 1999

INVENTOR(S) : Pierre M. Selwan, Minjhing Hsieh, Mel W. Eatherington

It is certified that error appears in the above-identified patent and that said Letters Patent is hereby corrected as shown below:

In column 1, line 10 replace "Modem" with --Modern--.

In column 2, line 5, replace "scheme arbitration" with --arbitration scheme--.

In column 3, line 51, replace "exit" with --exist--.

<u>In the Claims</u>

In column 9, line 18, replace "is" with --its--.

Signed and Sealed this

Twenty-third Day of November, 1999

*Attest:*

Q. TODD DICKINSON

*Attesting Officer*     *Acting Commissioner of Patents and Trademarks*